(12) United States Patent
Vauchel et al.

(10) Patent No.: US 8,840,059 B2
(45) Date of Patent: Sep. 23, 2014

(54) ASSEMBLY OF COMPONENTS CONNECTED BY A DEVICE THAT MAINTAINS THE INTEGRITY OF THE SURFACE OF ONE OF THE COMPONENTS

(75) Inventors: Guy Bernard Vauchel, Harfleur (FR); Guillaume Ruckert, Fiquefleur-Equainville (FR)

(73) Assignee: Aircelle, Gonfreville l'Orcher (FR)

( * ) Notice: Subject to any disclaimer, the term of this patent is extended or adjusted under 35 U.S.C. 154(b) by 868 days.

(21) Appl. No.: 13/056,727

(22) PCT Filed: Jul. 28, 2009

(86) PCT No.: PCT/FR2009/000934
§ 371 (c)(1),
(2), (4) Date: Jan. 31, 2011

(87) PCT Pub. No.: WO2010/012899
PCT Pub. Date: Feb. 4, 2010

(65) Prior Publication Data
US 2011/0131945 A1 Jun. 9, 2011

(30) Foreign Application Priority Data

Jul. 30, 2008 (FR) .................... 08 04348
Nov. 6, 2008 (FR) .................... 08 06196
Dec. 22, 2008 (FR) .................... 08 07350

(51) Int. Cl.
| | | |
|---|---|---|
| F02B 27/00 | (2006.01) | |
| F02C 7/20 | (2006.01) | |
| B64D 33/02 | (2006.01) | |
| F02C 7/047 | (2006.01) | |
| B64D 15/04 | (2006.01) | |
| F02C 7/045 | (2006.01) | |

(52) U.S. Cl.
CPC ............... *B64D 33/02* (2013.01); *Y02T 50/672* (2013.01); *F02C 7/047* (2013.01); *B64D 2033/0286* (2013.01); *B64D 15/04* (2013.01); *B64D 2033/0233* (2013.01); *F02C 7/045* (2013.01); *B64D 2033/0206* (2013.01); *F05D 2260/96* (2013.01)

USPC .................... 244/53 B; 60/796; 137/15.1

(58) Field of Classification Search
CPC .................................. B64D 33/02; F02C 7/04
USPC ....... 244/53 B; 137/15.1, 15.2; 181/213, 214; 60/796, 798, 799
See application file for complete search history.

(56) References Cited

U.S. PATENT DOCUMENTS 3,481,427 A 12/1969 Dobbs
4,235,303 A 11/1980 Dhoore
(Continued)

FOREIGN PATENT DOCUMENTS

EP 1591643 A1 11/2005
FR 2906568 A1 4/2008
GB 2112339 7/1983

OTHER PUBLICATIONS

Peter Goransson, "Tailored acoustic and vibrational damping in porous solids-Engineering performance in aerospace applications", Aerospace Science and Technology 12 (2008) 26-41.
Uday K. Vaidya, "Impact and post-impact vibration response of protective metal foam composite sandwich plates" Materials Science and Engineering A 428 (2006) 59-66.

(Continued)

*Primary Examiner* — Gerald L Sung
(74) *Attorney, Agent, or Firm* — Brinks Gilson & Lione

(57) ABSTRACT

This assembly comprises a first component (9), a second component (3), and a connecting device (19) for connecting these two components together, this device (19) being of the type that maintains the integrity of the surface of said second component (3), and the assembly being noteworthy in that said connecting device (19) comprises a structural skin (21) fixed to said first component (9) and a porous material (23) attached to this structural skin and fixed by contact to said second component (3).

22 Claims, 3 Drawing Sheets

(56) References Cited

U.S. PATENT DOCUMENTS

| | | |
|---|---|---|
| 4,240,250 A | 12/1980 | Harris |
| 4,759,513 A * | 7/1988 | Birbragher .................... 244/1 N |
| 4,924,228 A * | 5/1990 | Novak et al. ....................... 342/2 |
| 2005/0183903 A1 | 8/2005 | Stevenson |
| 2005/0218261 A1 * | 10/2005 | Porte et al. .................. 244/53 B |

OTHER PUBLICATIONS

Mesut Kirca, "Computational modeling of micro-cellular carbon foams", Finite Elements in Analysis and Design 44 (2007) 45-52.

International Search Report PCT/FR2009/000934; Dated Mar. 3, 2010.

* cited by examiner

ASSEMBLY OF COMPONENTS CONNECTED BY A DEVICE THAT MAINTAINS THE INTEGRITY OF THE SURFACE OF ONE OF THE COMPONENTS

TECHNICAL FIELD

The present invention concerns an assembly of components connected by a device that maintains the integrity of the surface of one of the components.

BACKGROUND

FIG. 1 illustrates an air intake structure of the prior art, with electric de-icing.

As known in itself, such an air intake structure 1 includes an outer panel 3, i.e. situated at the outer periphery of the nacelle, as well as an air intake lip 5, forming the leading edge of the nacelle, and situated in the extension of an annular inner part 7, often designated by the term "shroud," this shroud also being able to have sound absorption properties.

An internal partition 9 makes it possible to strengthen the air intake structure.

With the aim of reducing sound emissions from the nacelle, the air intake lip 5 is traditionally equipped with a sound attenuation panel P, having a honeycomb structure, the lip 5 being provided with perforations 6.

The inner partition 9 is typically riveted on one hand on the inner skin of the monolithic portion 11 of the panel P, and on the other hand on the inner skin 13 of a connecting member 15 also having a honeycomb structure, this honeycomb structure as well as the ends 17a, 17b of the inner skin 13 being fastened by adhesion to the inside of the outer skin 3.

The use of such an intermediate connecting member 15 makes it possible to prevent the connecting rivets of the partition 9 from protruding towards the outside of the outer panel 3, and thus do not disrupt the aerodynamic performance of the air intake structure.

An electric de-icing means, known in itself, is integrated into the air intake lip 5.

The connecting member 15, the honeycomb structure of which is generally metal, has a weight that is important to be able to reduce.

Moreover, if one wishes to use a pneumatic de-icing instead of the electric de-icing, the temperatures inside the compartment 19 delimited by the partition 9 are high: typically in the vicinity of 400° C.

At these temperatures, the fastening glue of the connecting member 15 does not stand up, which poses a problem for the resistance of the make-up of the structure.

BRIEF SUMMARY

The present invention in particular generally aims to provide a connecting device adapted to connect two components while preserving the integrity of the surface of one of the two components, which has a lower weight than the honeycomb structure connecting member 15.

Another aim of the invention is to provide a connecting member of the aforementioned type that can be installed in a zone where the temperatures are high, as is for example the case in the pneumatic de-icing compartment of an air intake structure.

This aim of the invention is achieved with an assembly comprising a first component, a second component, and a connecting device between said two components, the device being of the type making it possible to preserve the integrity of the surface of the second component, this assembly being remarkable in that it comprises a structural skin fixed to said first component and a porous material attached on said structural skin and assembled by contact on said second component.

"Assembly by contact" refers to non-invasive fixing on the second component, and in particular fixing by brazing or adhesion.

The use of a porous material, i.e. a material having numerous cells not filled with material, allows substantial weight savings in relation to a connecting member of the honeycomb type of the prior art.

According to other optional features of the assembly:

- said porous material is chosen in the group comprising foams, expanding materials, felts, aggregates of small elements;
- said porous material has closed cells, i.e. not communicating;
- said porous material has open cells, i.e. communicating;
- said porous material is fixed by brazing or adhesion on said structural skin and/or on said second component;
- said structural skin extends beyond said porous material and its ends are also fastened by contact on said second component;
- said first component is fixed by riveting on said structural skin;
- the material forming said porous material is chosen in the group comprising metal, polymer, ceramic or composite materials;
- said porous material is selected in the group comprising materials resisting temperatures of up to 200° C., material resisting temperatures up to 400° C., materials resisting temperatures up to 600° C., and materials resisting temperatures up to 800°: this type of porous material can in particular be used to connect an inner partition of a de-icing compartment with the inner face of an outer panel of an air intake structure with pneumatic de-icing;
- the material forming said porous material is chosen in the group comprising metal or ceramic materials;
- said ceramic material is carbon foam;
- said porous material is adhered to said structural skin;
- said structural skin is formed in materials chosen from the group comprising metal alloys, ceramics, metal matrix composites, ceramic matrix composites;
- said porous material is formed by a superposition of layers of porous materials with different characteristics, in the direction of the thickness of the material;
- said porous material is formed by a juxtaposition of blocks of porous materials with different characteristics, in the direction parallel to the middle plane of the material;
- at least one honeycomb structure is juxtaposed with said porous material, this structure and this material being sandwiched by said structural skin and said second component.

The present invention also concerns an air intake structure for a turbojet engine nacelle with pneumatic de-icing, including an air intake lip, an outer panel and an inner partition connecting said air intake lip to said outer panel and defining a pneumatic de-icing compartment, remarkable in that said inner partition is connected to said outer panel by a connecting member comprising a structural skin fixed to said inner partition and a porous material attached on said structural skin and fixed by contact inside said outer panel, such that said inner partition, said connecting member and said outer panel form an assembly according to the preceding.

According to other optional features of this air intake structure:

said air intake lip is provided with at least a first sound attenuation panel made of an open cell porous material able to withstand a temperature of up to 400° C. and with a high thermal conductivity, situated inside said de-icing compartment and maintained by an upstream maintenance sheet and a downstream maintenance sheet, this acoustic panel and the downstream maintenance sheet defining, with said inner partition and said lip, an assembly according to the preceding;

said air intake structure comprises a second sound attenuation panel made of an open cell porous material fixed inside said air intake lip downstream of the inner partition, separated from the first panel by a joint made of an open cell porous material able to withstand a temperature of up to 400° C. and having a low heat conductivity;

said second sound attenuation panel is chosen in the group comprising a panel with a porous material and open cells according to the preceding, able to withstand a temperature of up to 120° C., and a panel with a honeycomb structure;

said first panel, said joint in a porous material and said second panel are covered with a shared sheet on which said inner partition is fixed, preferably by riveting, said inner partition, said shared sheet and said panels defining an assembly according to the preceding;

said air intake structure is of the type in which the air intake lip forms a single-piece assembly with the outer wall of the air intake structure, this single-piece assembly being able to slide in relation to the fan case of the turbojet engine, as described in document FR 2 906 568 for example.

BRIEF DESCRIPTION OF THE DRAWINGS

Other features and advantages of the present invention will appear in light of the following description, and upon examination of the appended figures, where.

DETAILED DESCRIPTION

In all of these figures, similar or identical references designate similar or identical members or assemblies of members.

Figure 2:
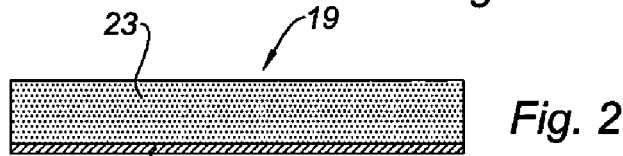
FIG. 2 illustrates, diagrammatically and in cross-section, on a large scale, one embodiment of a connecting member able to be incorporated into an assembly according to the invention.

As shown in FIG. 2, a connecting member 19 intended to be incorporated into an assembly according to the invention includes a structural skin 21, formed in a sheet.

Attached on this structural skin 21 is a porous material 23, i.e. a material i.e. a material having numerous cells not filled with material.

This porous material, which can assume the form of foam, or an expanded form, or the form of felt, or the form of an aggregate of small elements such as beads, can be fixed by adhesion or brazing on the structural skin 21.

Depending on whether or not one is seeking sound absorption properties, this porous material may have open, i.e. communicating, cells, or closed, i.e. non-communicating, cells, respectively.

The porous material 23 can be formed from commercially available metal, polymer, ceramic or composite materials.

This porous material 23 is chosen as a function of the usage conditions of the connecting member 19.

The table below provides, as an example, different types of foams that may be suitable for use as porous material for different usage conditions of the connecting member:

| Features | Nature of the foams | Examples of commercially available foams |
|---|---|---|
| Foams resistant to relatively high temperatures (up to 600° C. and beyond) | Nickel-chrome alloy-based foams - density of 0.6 to 0.65 g/cm3 | RECEMAT ® - marketed by the company RECEMAT INTERNATIONAL, or metal foams from the company FiberNide |
| | Carbon foam - can withstand beyond 600° C. | |
| Foam resistant to relatively low temperatures (up to 200° C.) | Aluminum-based foams - density from 0.2 to 0.4 g/cm3 Polymethacrylimide foam - density of 0.05 g/cm3 | Foams by the company CYMAT ROHACELL ® - marketed by the company EMKAY PLASTICS |
| Foams having a relatively high thermal conductivity | Nickel-based foams - conductivity can reach 9 W/mK for a minimum porosity of 90% Aluminum and copper alloy-based foams - conductivity can reach 10 W/mK for a minimum porosity of 65% Carbon foam - conductivity can reach 25 W/mK for a minimum porosity of 78% | |
| Foams having a relatively low thermal conductivity | Ceramic foam - conductivity from 0.01 to 1 W/mK for a density from 0.02 to 0.4 g/cm3 Polymethacrylimide foam - conductivity of 0.031 W/mK for a density of 0.032 g/cm3 | ROHACELL 31 ® marketed by the company EMKAY PLASTICS |

In the particular case where the connecting member 19 is intended to be installed in high temperature areas of an aircraft nacelle (in particular in the exhaust gas discharge area of the turbojet engine), it is provided that the porous material 23 is formed in a material able to resist temperatures of up to 800° C.: carbon foam may be suitable, for instance.

Concerning the material used for the structural skin 1 of the connecting member 19, the choice will be made as a function of the weight, temperature, and mechanical stress constraints.

This material may be chosen among metal alloys, ceramics, metal matrix composites (MMC) and ceramic matrix composites (CMC).

It will be noted that the porous material 23 may not be homogeneous, but rather on the contrary may have zones with different sound absorption characteristics.

These different zones can be zones where material is absent (cavities), and/or zones of porous materials of different natures (different foam densities, for example).

Such a heterogeneity of the porous material 23 can be obtained by superpositions of layers of different porous materials in the thickness of the connecting member and/or by juxtaposition of blocks of porous materials following the direction of the middle plane of the panel.

Such a heterogeneity of the porous material 23 makes it possible to produce a custom connecting member, i.e. that is perfectly adapted to the conditions (geometry, temperature, sound absorption characteristics, weight restrictions . . . ) in which it is meant to be used.

The following examples illustrate different embodiments of an assembly according to the invention, incorporating connecting members of the type just described.

All of these examples are applicable to the particular case of an aircraft air intake structure similar to that described in the preamble of this description, but it goes without saying that these examples are in no way limiting, and that an assembly according to the present invention could be used in particular in other areas of an aircraft turbojet engine nacelle.

In the following, we will endeavor to describe only the distinctive characteristics in relation to those of the air intake structure mentioned in the preamble of this description.

Figure 3:
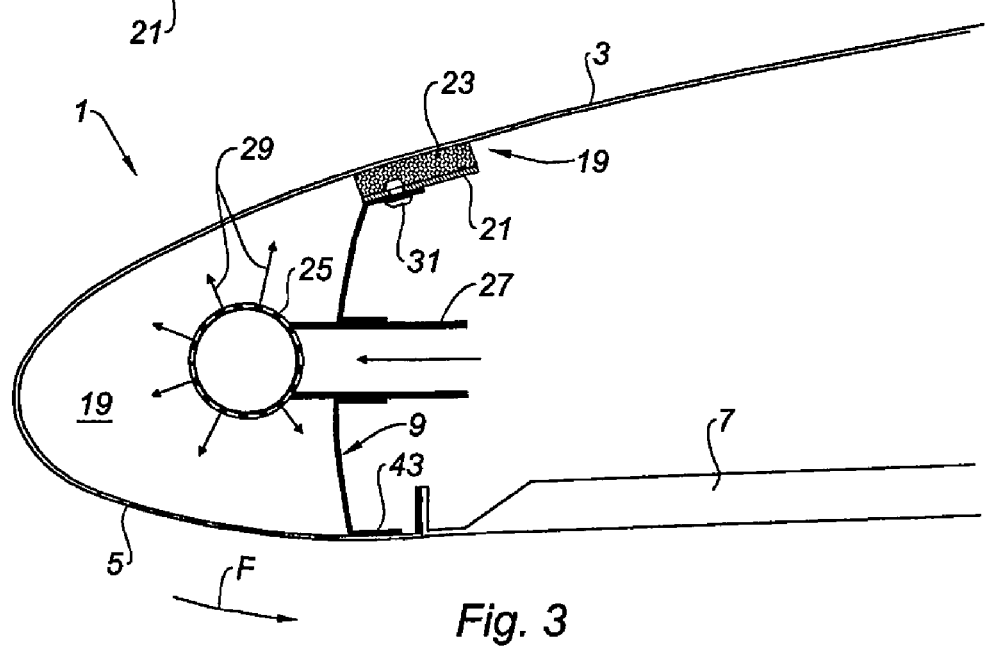
FIGS. 3 to 7 illustrate different embodiments of air intake structures for a turbojet nacelle incorporating assemblies according to the invention.

In reference to FIG. 3, a hot air manifold 25 is shown connected to at least one hot air feed pipe 27, itself connected to the hot area of the turbojet engine (not shown).

This hot air manifold 25 makes it possible to distribute the hot air 29 inside the compartment 19, and thereby to raise the temperature of said compartment to temperatures of up to 400° C.: in this way it is possible to perform a so-called "pneumatic" de-icing of the lip 5 of the air intake structure 1.

In an operating situation, the flow of air F runs along the lip 5 and the shroud 7 before passing inside the turbojet engine arranged inside the nacelle.

In the following, the terms "upstream" and "downstream" must be understood in relation to the air circulation direction, as indicated by arrow F.

The air intake structure 1 can be of the type in which the air intake lip 5 and the outer panel 3 form a single-piece assembly, able to slide in relation to the shroud 7 during maintenance operations, as taught for example in document FR 2 906 568: in this case the structure is commonly called "laminar forward cowl" (LFC).

It will, however, be noted that the invention is in no way limited to this particular type of air intake structure.

In the example illustrated in FIG. 3, the air intake lip 5 does not have a sound absorption means, and the inner partition 9 is directly fixed on said lip.

This inner partition 9 is, at its other end, connected to the outer panel 3 via a connecting member 19 according to the preceding: more precisely, the concerned end of the inner partition 9 is fixed using fixing means such as rivets 31 on the structural skin 21 of the connecting member 19, and the porous material 23 is fixed by contact, for example adhesion or brazing, inside the outer panel 3.

In this particular application, the porous material 23 can be composed of a foam resistant to high temperatures (up to 400° C.) and with low thermal conductivity, for example a ceramic foam.

A foam with good thermal conductivity can, however, be chosen if one wishes to perform efficient de-icing of the portion of the outer panel 3 situated at the connecting member 19.

It is therefore understood that this connecting member makes it possible to connect the inner partition 9 to the outer panel 3 without intrusion in this outer panel, such that the aerodynamic characteristics of this outer panel are not altered.

Figure 1:
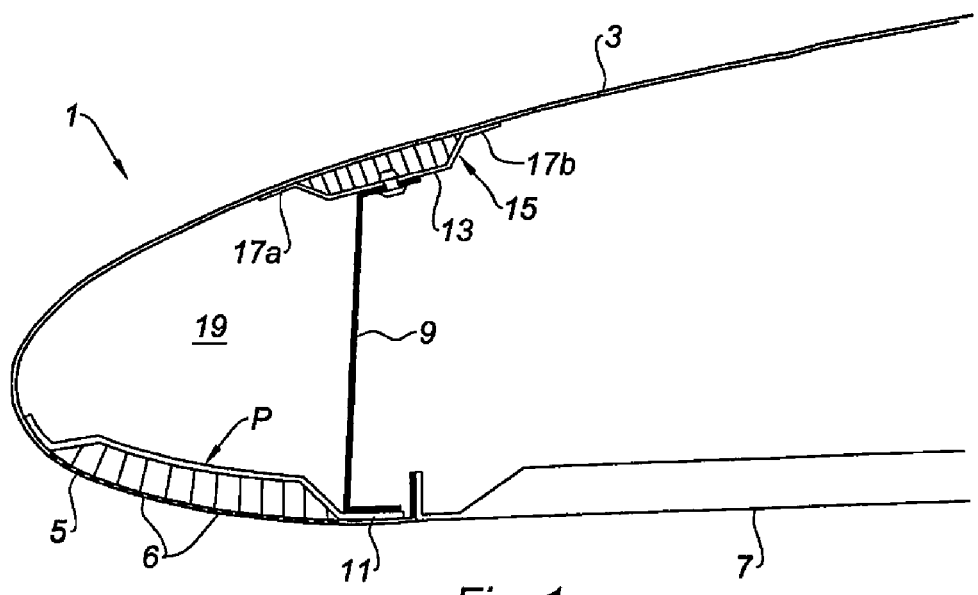
FIG. 1 illustrates an air intake structure of the prior art, as described in the preamble of this description.

The use of a porous material 23 makes it possible to considerably lighten the connecting means of the inner partition 9 at the outer panel 3 in relation to the honeycomb-type solutions of the prior art (see FIG. 1).

Moreover, by choosing a porous material 23 adapted to the temperature conditions prevailing in this particular area of the nacelle, one is freed from stability problems at high temperatures of honeycomb-type connecting structures.

It should also be noted that the connecting member 19, which can be made with commercially available foams, is very economical.

Figure 4:
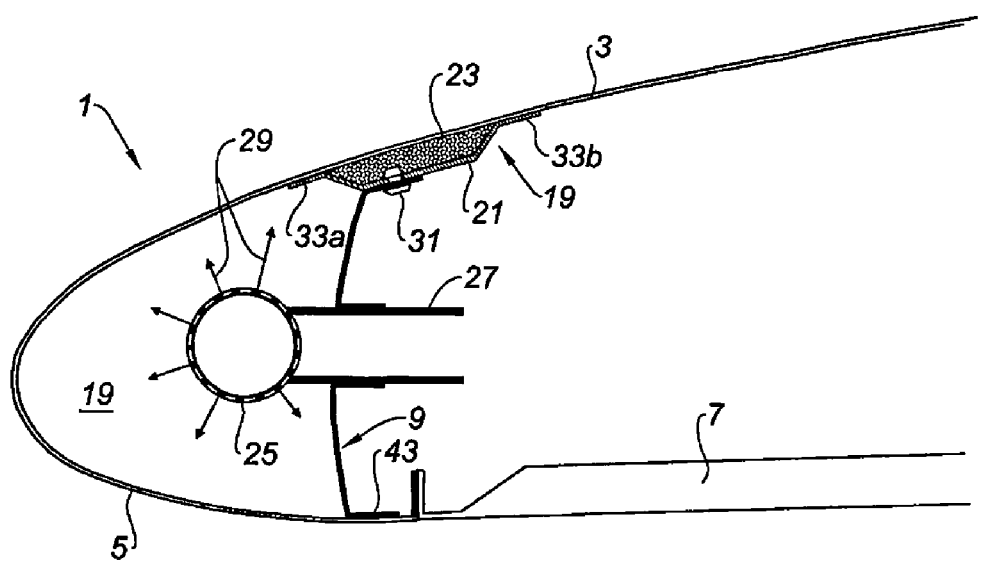

The alternative illustrated in FIG. 4 shows that the structural skin of the connecting member 19 can advantageously be provided so as to extend beyond the porous material 23, and its ends 33a, 33b fixed by adhesion or brazing inside the outer panel 3.

Figure 5:
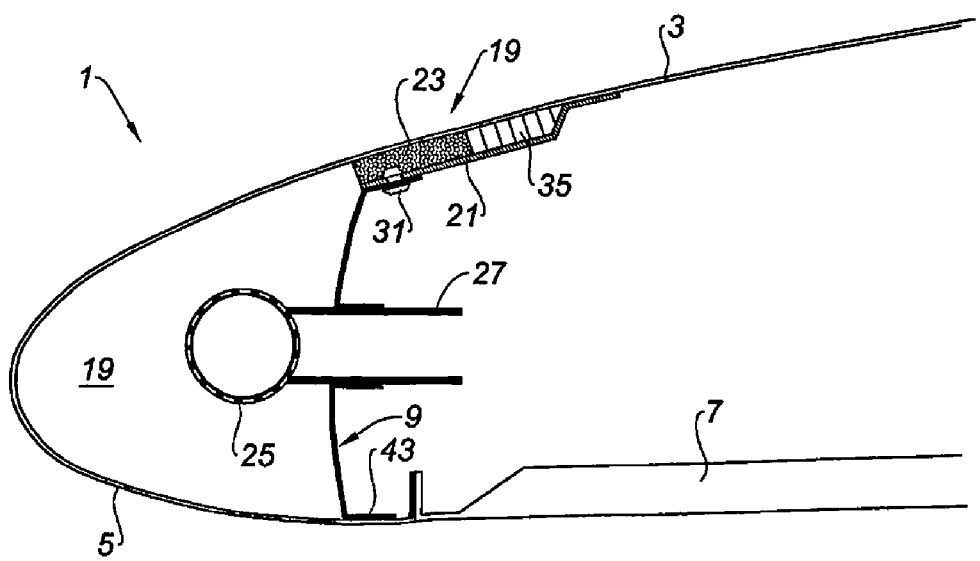

In the alternative illustrated in FIG. 5, a honeycomb structure 35 is provided arranged in the extension of the porous material 23, the structural skin 21 covering both the porous material 23 and the structure 35: in this way the porous material 23 is in a hot zone, and the honeycomb structure 35, situated downstream of the inner partition 9, is in a cold zone.

In this alternative, the length and the characteristics of the porous material 23 are chosen such that at its downstream end, the temperatures are compatible with the honeycomb structure 35.

Several porous materials can even be chosen so as to obtain good heat conduction towards the portion of the outer panel 3 situated at the inner partition on one hand, and a dam with regard to heat transmission towards the honeycomb structure 35 on the other hand.

Figure 6:
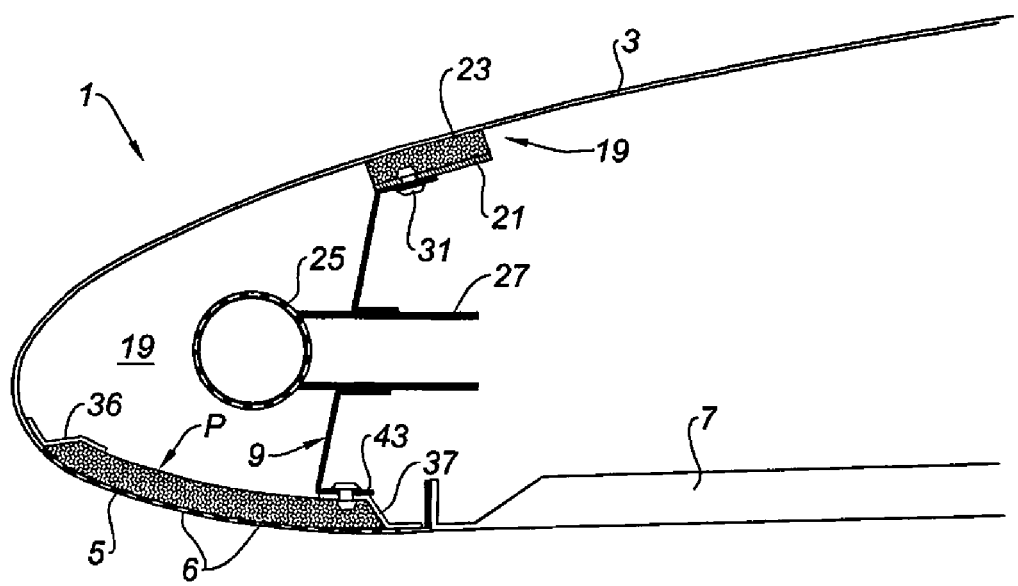

The alternative of FIG. 6 differs from that of FIG. 3 in that the air intake lip 5 comprises a sound attenuation panel P itself formed in a porous material (and not a honeycomb structure as in the case of the air intake structure of FIG. 1), and maintained by an upstream sheet 36 and a downstream sheet 37.

The inner partition 9 is typically riveted on the downstream sheet 37.

The porous material of the sound attenuation panel P is chosen so as to be able to withstand a temperature of up to 400° C.

One will also ensure that this porous material has high heat conductivity, so as to allow the heat from the hot air situated inside the de-icing compartment 19 to radiate to the surface of the air intake lip 5, thereby enabling efficient de-icing.

Figure 7:
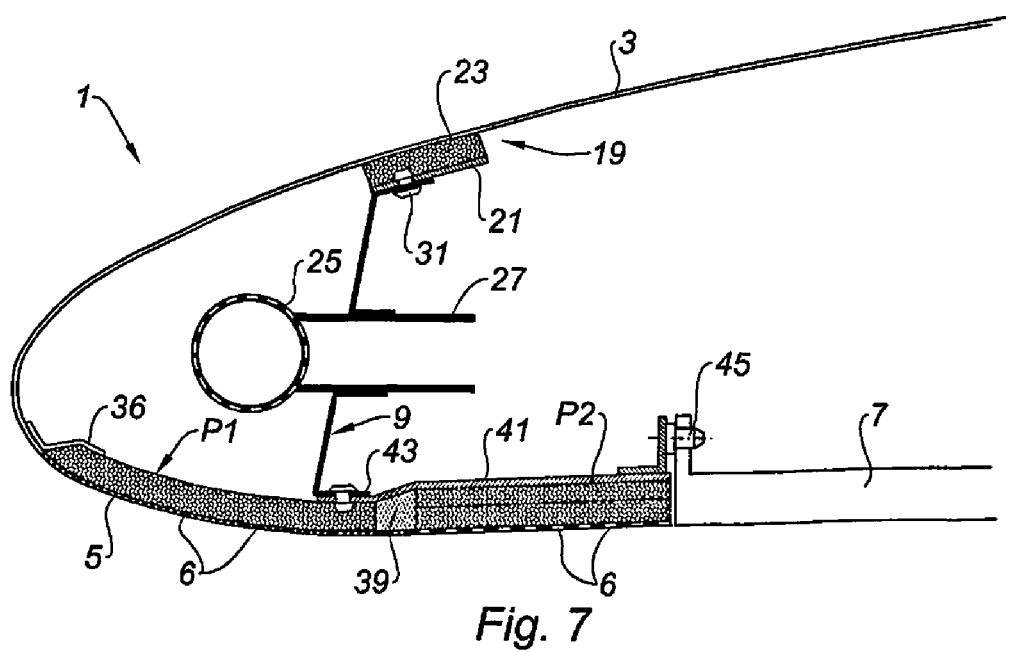

In the alternative illustrated in FIG. 7, a panel P1 similar to the panel P of the alternative of FIG. 6 is shown, downstream of which is a panel P2 according to the invention, and the porous material of which is chosen so as to withstand a temperature of up to 120° C.

Between these two panels P1 and P2 is a substantially annular joint 39, preferably formed in a porous material able to withstand temperatures of up to 400° C.

As visible in FIG. 7, the joint 33 and the sound attenuation panel P2 are situated downstream of the inner partition 9. More precisely, a sheet 41 covers the downstream portion of the panel P1, the joint 39 and the panel P2, the return 43 of the inner partition 25 preferably being fixed by riveting on the upstream portion of the sheet 41.

In the particular case where the air intake structure is of the aforementioned LFC type, centering members 45 can be provided fixed on the sheet 41, making it possible to center the air intake structure 1 in relation to the shroud 7.

As in the case of FIG. 6, the skin of the air intake lip 5 forms the structural skin of the panels P1 and P2, this structural skin being provided with perforations 6.

Of course, different acoustic properties can be chosen for each of the panels P1 and P2, and the assembly of the panels P, P1, P2 can be formed by juxtaposition and/or superposition of blocks of foam, possibly provided with cavities.

Of course, one may also consider replacing the sound attenuation panel P2 made from a porous material according to the invention with a traditional sound attenuation panel, of the type comprising a honeycomb structure: the zone in which the panel P2 is located being significantly less hot than the zone in which the panel P1 is located, the use of a traditional sound attenuation panel is indeed possible.

It will also be noted that one will preferably choose, for the joint 39, a porous material having a low heat conductivity, so as to correctly insulate the panel P2 in relation to the panel P1: a ceramic foam may, for example, be suitable for said joint.

It is understood that in the alternatives of FIGS. 6 and 7, the sheet 37 or 41 and the panel P or P1 constitute connecting members of the inner partition 9 to the lip 5 according to the precepts of the invention, i.e. the outer partition 9 is fixed on a structural skin 37, 41 which itself is adhered or brazed on a porous material P or P1, itself adhered or brazed to the inside of the lip 5, allowing a non-invasive connection with said lip, and therefore preservation of the aerodynamic features of the lip.

Of course, this invention is in no way limited to the embodiment described and illustrated, provided as a mere example.

The invention claimed is:

1. An air intake assembly for an engine nacelle comprising:
a structural inner partition,
an outer panel exposed to an aerodynamic flow and disposed radially outward from an air intake of the engine nacelle,
a connecting device between said structural inner partition and said outer panel, the connecting device configured to preserve integrity of an aerodynamic surface of said outer panel, the connecting device comprising:
a structural skin fixed to said structural inner partition, and
a porous material attached on said structural skin and fixed by contact on an inner side of said outer panel such that the connecting member does not intrude on the outer panel and alter aerodynamic characteristics of the aerodynamic surface of the outer panel.

2. The assembly according to claim 1, wherein said porous material comprises at least one of foams, expanding materials, felts, aggregates of small elements.

3. The assembly according to claim 1, wherein said porous material has closed cells that are not communicating.

4. The assembly according to claim 1, wherein said porous material has open cells that are communicating.

5. The assembly according to claim 1, wherein said porous material is fixed by brazing or adhesion on said structural skin and/or on said outer panel.

6. The assembly according to claim 1, wherein said structural skin extends beyond said porous material and ends are also fastened by contact on said outer panel.

7. The assembly according to claim 1, wherein said structural inner partition is fixed by riveting on said structural skin.

8. The assembly according to claim 1, wherein a material forming said porous material comprises at least one of metal, polymer, ceramic and composite materials.

9. The assembly according to claim 1, wherein said porous material comprises at least one of materials resisting temperatures of up to 200° C., material resisting temperatures up to 400° C., materials resisting temperatures up to 600° C., and materials resisting temperatures up to 800°.

10. The assembly according to claim 1, wherein a material forming said porous material comprises metal or ceramic materials.

11. The assembly according to claim 10, wherein said ceramic material is carbon foam.

12. The assembly according to claim 1, wherein said porous material is adhered to said structural skin.

13. The assembly according to claim 1, wherein said structural skin is formed in materials comprising at least one of metal alloys, ceramics, metal matrix composites, and ceramic matrix composites.

14. The assembly according to claim 1, wherein said porous material is formed by a superposition of layers of porous materials with different characteristics, in a direction of a thickness of the material.

15. The assembly according to claim 1, wherein said porous material is formed by a juxtaposition of blocks of porous materials with different characteristics, in a direction parallel to a middle plane of the material.

16. The assembly according to claim 1, wherein at least one honeycomb structure is juxtaposed with said porous material, said honeycomb structure and said porous material being sandwiched by said structural skin and said outer panel.

17. An air intake structure for a turbojet engine nacelle with pneumatic de-icing, including an air intake lip, said outer panel and said structural inner partition connecting said air intake lip to said outer panel and defining a pneumatic de-icing compartment, wherein said structural inner partition is connected to said outer panel by said connecting device, such that said structural inner partition, said connecting device and said outer panel form the air intake assembly according to claim 1.

18. The air intake structure according to claim 17, wherein said air intake lip is provided with at least a first sound attenuation panel made of an open cell porous material able to withstand a temperature of up to 400° C. and with a high thermal conductivity, situated inside said de-icing compartment and maintained by an upstream maintenance sheet and a downstream maintenance sheet, said first sound attenuation panel and the downstream maintenance sheet defining, with said structural inner partition and said air intake lip, the air intake assembly.

19. The air intake structure according to claim 18, further comprising a second sound attenuation panel made of an open cell porous material fixed inside said air intake lip downstream of the structural inner partition, separated from said first sound attenuation panel by a joint made of an open cell porous material able to withstand a temperature of up to 400° C. and having a low heat conductivity.

20. The air intake structure according to claim 19, wherein said second sound attenuation panel is chosen in the group comprising a panel with a porous material and open cells able to withstand a temperature of up to 120° C., and a panel with a honeycomb structure.

21. The air intake structure according to claim 19, wherein said first sound attenuation panel, said joint in a porous material and said second sound attenuation panel are covered with a shared sheet on which said structural inner partition is fixed, by riveting, said structural inner partition, said shared sheet and said first/second sound attenuation panels defining the air intake assembly.

22. The air intake structure according to claim 17, wherein the air intake lip forms a single-piece assembly with an outer wall of the air intake structure, said single-piece assembly being able to slide in relation to a fan case of the turbojet engine.

* * * * *